United States Patent Office 2,947,749
Patented Aug. 2, 1960

2,947,749

α-(3-MORPHOLYL)-BENZHYDROL AND ITS SALTS

Stanley O. Winthrop, Montreal, Quebec, Canada, assignor to American Home Products Corporation, New York, N.Y., a corporation of Delaware No Drawing. Filed June 19, 1959, Ser. No. 821,369

3 Claims. (Cl. 260—247.7)

This invention relates to certain new chemical compounds and to the methods by which they may be prepared from readily available starting materials.

More particularly, my invention is concerned with the new chemical compound, α-(3-morpholyl)-benzhydrol, and its salts, particularly its hydrohalide salts. These compounds are useful as a stimulant for the central nervous system, and in test animals their spontaneous activity is markedly increased. The compounds also possess activity in antagonizing the depressant action of the alkaloid bulbocapnine. Hypnosis by the action of pentobarbital is potentiated by the compound, unlike most stimulant drugs which antagonize the action of pentobarbital.

My new chemical compound, α-(3-morpholyl)-benzhydrol, has the following structure

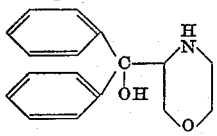

It forms salts upon the addition of acid, and the hydrohalide salts, in particular the hydrochloride salt, possess the same therapeutic activity.

In preparing the novel compound, α-(3-morpholyl)-benzhydrol, I prefer to use as starting material the compound 1,1-diphenyl-2-amino-1,3-propanediol. The latter compound may be readily prepared by the process of Rebstock, J.A.C.S., 75, page 1685 (1954).

The procedure employed may be summarized as follows. Details as to the particular steps are given in the examples which appear below.

1,1-diphenyl-2-amino-1,3-propanediol is first converted to 1,1 - diphenyl - 2 - (α - chloroacetamido) - 1,3 - propanediol by treatment with chloroacetylchloride. The resulting product is then treated with an alcoholic solution of a strong base, thus forming 5-(α-hydroxybenzhydryl)-3-morpholone. The latter is then reduced with lithium aluminum hydride to the desired compound α-(3-morpholyl)-benzhydrol. In a preferred procedure the reduction is carried out with lithium aluminum hydride in ether, and after removal of the aluminum hydroxide hydrogen chloride is introduced in order to precipitate the desired compound, α-(3-morpholyl)-benzhyrol in the form of its hydrochloride salt. This may then be dissolved in water and the resulting solution neutralized with an alkaline agent, thereby precipitating α-(3-morpholyl)-benzhydrol which may be recovered from the reaction mixture.

The chemical changes occurring may be represented as follows:

The following examples are illustrative of the invention:

EXAMPLE 1

1,1-diphenyl-2-(α-chloroacetamido)-1,3-propanediol 30 grams (0.124 mole) of 1,1-diphenyl-2-amino-1,3-propanediol, 5.2 grams (0.13 mole) of sodium hydroxide, 400 mls. of ethylenedichloride and 200 mls. of water were mixed together, stirred and cooled in an ice bath. There was then added thereto, dropwise, 14.7 grams (0.13 mole) of chloroacetylchloride. The reaction temperature was held within the range 0° to 5° C.

After all of the chloroacetylchoride had been added the reaction mixture was stirred for three hours, at the same time being allowed to warm up to room temperature. The ethylenedichloride layer was separated off and evaporated down in vacuo, i.e. at a pressure less than atmospheric. There were thus secured 38 grams of a solid product, melting at 166–168° C. This product was dissolved in isopropanol and recrystallized from this solvent, the melting point being raised thereby to 167–169° C. The compound was 1,1-diphenyl-2-(α-chloroacetamido) 1,3-propanediol.

Analysis confirmed the empiric fromula $C_{17}H_{18}NO_3Cl$. Calculated: C, 63.90; H, 5.68; N, 4.38; Cl, 11.08. Found: C, 63.60; H, 6.13; N, 4.47; Cl, 11.04.

EXAMPLE 2

5-(α-hydroxybenzhydryl)-3-morpholone 35 grams (0.11 mole) of 1,1-diphenyl-2-(α-chloroacetamido)-1,3-propanediol were dissolved in 400 mls. of absolute ethanol containing 6.2 grams (0.11 mole) of powdered, dried potassium hydroxide. The solution was stirred at room temperature for three hours and then warmed up to 40° C. by heating for 30 minutes. 6 grams of solid potassium chloride was then removed and the filtrate evaporated to yield an oily residue. This oily residue solidified on trituration with acetone, yielding 9.5 grams of a solid product melting at 218–220° C. This product, 5-(α-hydroxybenzhydryl) - 3-morpholone, was dissolved in methanol and recrystallized therefrom, but the melting point did not change.

Analysis confirmed the empiric formula $C_{17}H_{17}NO_3$. Calculated: C, 72.06; H, 6.05; N, 4.94. Found: C, 72.10; H, 6.22; N, 5.05.

EXAMPLE 3

α-(3-morpholyl)-benzhydrol 9 grams (0.032 mole) of 5-(α-hydroxybenzhydryl)-3-morpholone was added portionwise to 2.4 grams (0.064 mole) of lithium aluminum hydride and 300 mls. of ether. The addition was complete in 20 minutes.

Refluxing was continued for a period of 2 hours, whereupon the excess lithium aluminum hydride and complex were carefully destroyed by the addition of 10.3 mls. of water. The aluminum hydroxide was then removed, the ether solution dried, and hydrogen chloride gas was bubbled in. Thereupon there precipitated the solid product α-(3-morpholyl)-benzhydrol hydrochloride, melting at 242–244° C. (dec.). 7.4 grams of analytically pure product were thus secured.

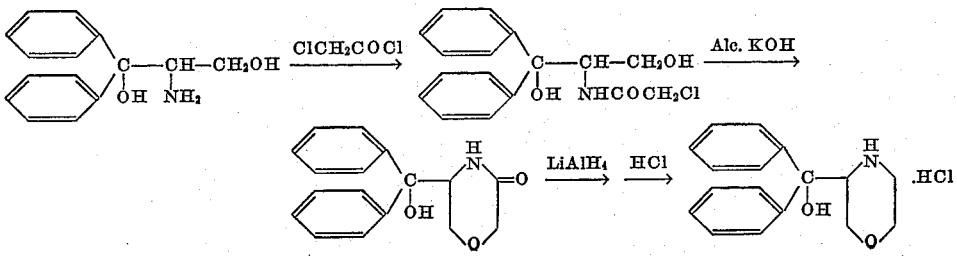

Analysis confirmed the empiric formula $C_{17}H_{20}NO_2Cl$. Calculated: N, 4.58; Cl, 11.60. Found: N, 4.63; Cl, 11.32.

The hydrochloride salt of α-(3-morpholyl)-benzhydrol was then dissolved in water and the solution neutralized by the addition of dilute sodium hydroxide solution. This caused the free base, α-(3-morpholyl)-benzhydrol, to precipitate out in the form of a crystalline solid, melting at 126–128° C.

Analysis confirmed the empiric formula $C_{17}H_{19}NO_2$. Calculated: N, 5.19. Found: N, 5.02.

This base was then further characterized by conversion to its hydrochloride salt by treatment with hydrogen chloride, whereupon the hydrochloride salt precipitated.

I claim:

1. A compound selected from the group which consists of α-(3-morpholyl)-benzhydrol and its hydrochloride salt.
2. α-(3-morpholyl)-benzhydrol.
3. α-(3-morpholyl)-benzhydrol hydrochloride.

References Cited in the file of this patent

Elderfield: Heterocyclic Compounds (textbook), vol. 6, pp. 506 and 530, 1957 Ed., John Wiley and Sons, Inc.